Aug. 5, 1941.　　　W. S. PRAEG　　　2,251,834
SHAPER BROACH
Filed March 25, 1940　　　3 Sheets-Sheet 1
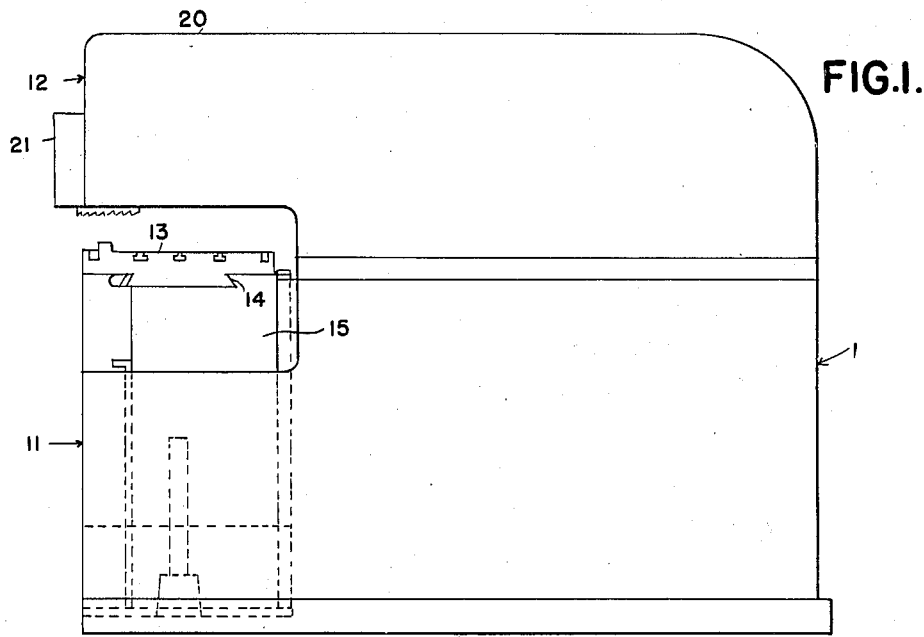
FIG.1.
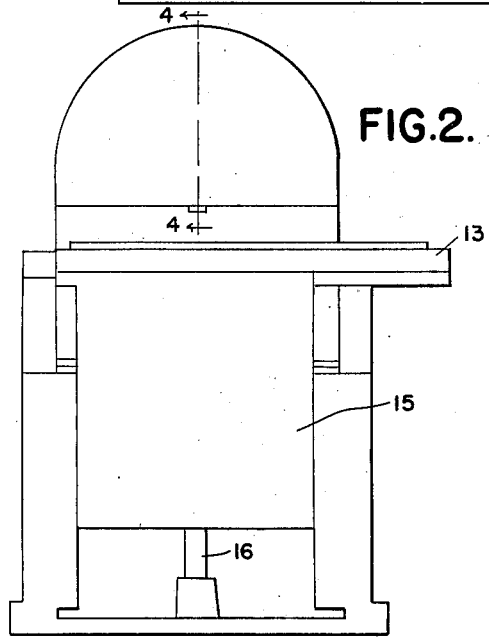
FIG.2.
FIG.3.
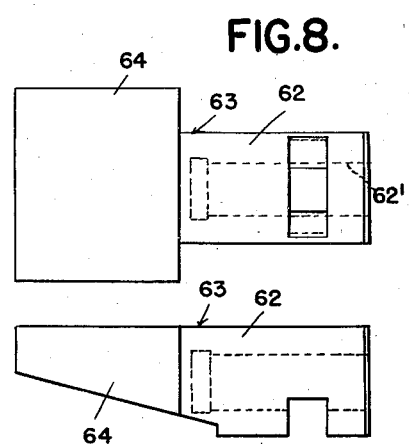
FIG.8.
FIG.9.
INVENTOR.
WALTER S. PRAEG
BY 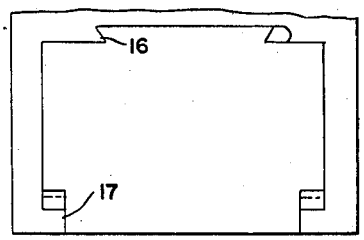
ATTORNEYS Aug. 5, 1941.                W. S. PRAEG                 2,251,834
                              SHAPER BROACH
                         Filed March 25, 1940         3 Sheets-Sheet 2

FIG.4.B.

INVENTOR.
WALTER S. PRAEG
BY Whittemore, Hulbert
& Belknap
ATTORNEYS

Aug. 5, 1941.                W. S. PRAEG                2,251,834
                             SHAPER BROACH
                         Filed March 25, 1940         3 Sheets-Sheet 3

INVENTOR.
WALTER S. PRAEG
BY Whittemore, Hulbert
& Belknap ATTORNEYS

Patented Aug. 5, 1941

2,251,834

UNITED STATES PATENT OFFICE 2,251,834

SHAPER BROACH

Walter S. Praeg, Detroit, Mich., assignor to National Broach & Machine Company, Detroit, Mich., a corporation of Michigan Application March 25, 1940, Serial No. 325,849

20 Claims. (Cl. 90—55)

The present invention relates to a shaper broach characterized by rapid removal of metal from a work piece.

The machine forming the subject matter of the present application comprises essentially a work support which is suitably adjustable so as to position the work piece in desired relation and to accomplish feed thereof as the work progresses. A tool which is in the form of a multiple bladed broach or shaper tool is reciprocated across the work piece.

As is well known, there is a definite limit to the amount of metal which can be removed in a single cut by a single blade of a tool, and this limitation reduces the efficiency of the ordinary shaper cutter. By employing a tool as disclosed in the present application the cut per tooth may be relatively large, although still within the permissible cut per tooth, but since a sequence of teeth are employed the cut made by the complete tool during a single cutting strike may be many times greater than the permissible cut per tooth.

In the present machine means are provided for permittling a relieving movement of the tool on the back stroke and positive means are provided for again positioning the tool in accurately predetermined and adjustable cutting position prior to the commencement of the cutting operation on the next succeeding cutting stroke. Means are also provided for adjusting the elongated cutting tool about its axis to vary the inclination of cut.

As will be readily evident by the present arrangement, the cut per tooth of the tool may be varied by adjusting its inclination from the horizontal during the cutting stroke.

With the foregoing general remarks in mind, it is an object of the present invention to provide a shaper broach characterized by its flexibility, rigidity, ease of operation, and productivity.

It is a further object of the present invention to provide a shaper broach characterized by relatively adjustable means for predetermining the angle of inclination of the cutting tool during the working stroke.

It is a further object of the present invention to provide a shaper broach characterized by the adjustability of a tool carrying portion about an axis parallel to the axis of an elongated broaching tool.

It is a further object of the present invention to provide novel means for permitting a movement of the broach to idle position on the idle stroke.

Other objects of the invention will be apparent as the description proceeds, and when taken in conjunction with the accompanying drawings wherein:

Figure 1 is a side elevation of my improved broaching machine;

Figure 2 is a front elevation of the same machine;

Figure 3 is a fragmentary view of the work table supporting frame;

Figure 4A:
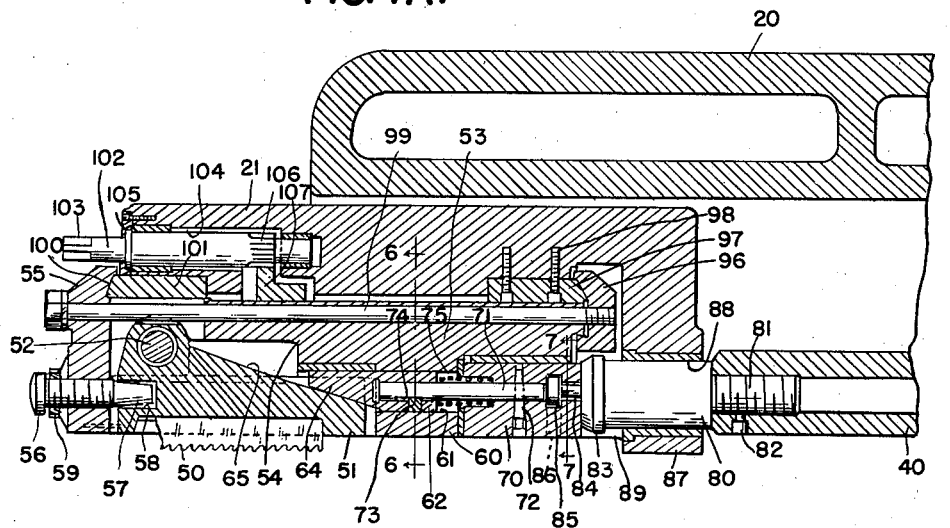
Figure 4A:
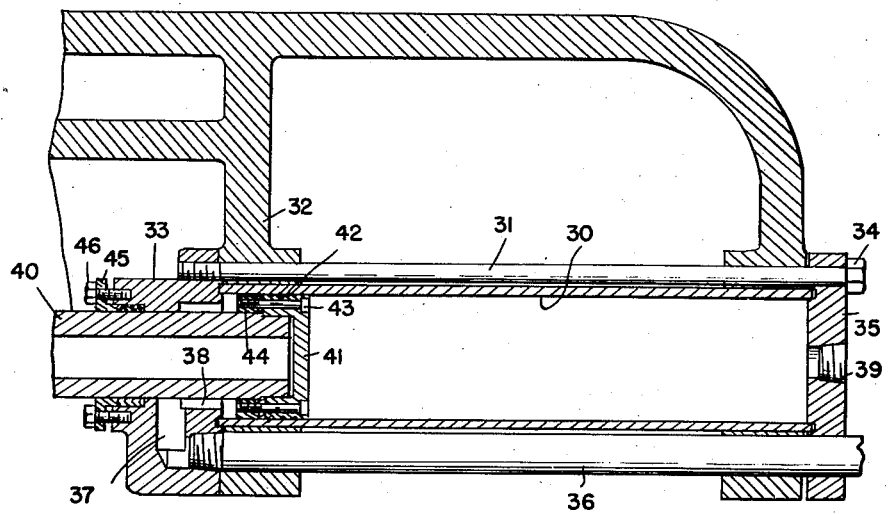
Figure 5:
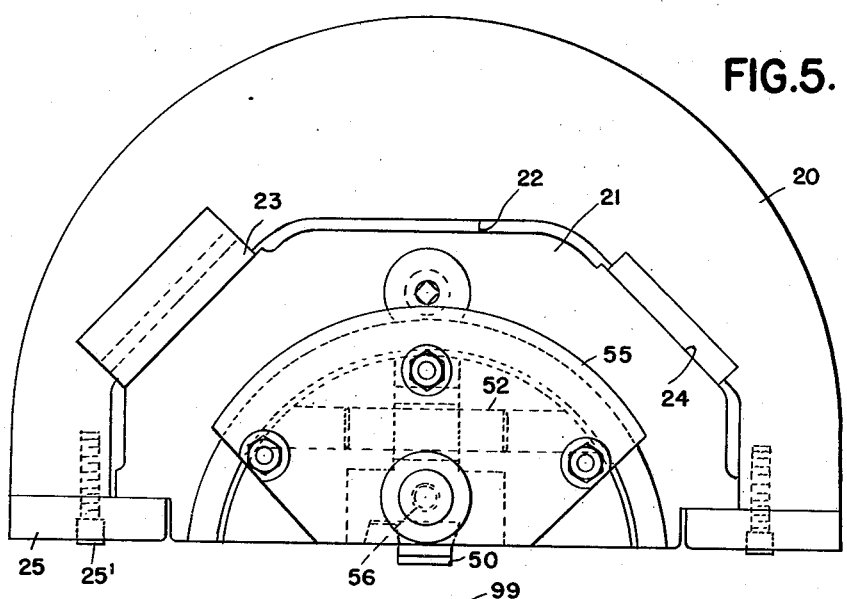
Figure 6:
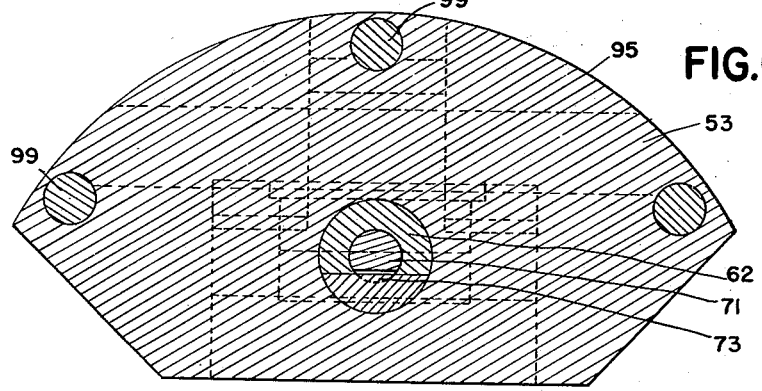
Figure 7:
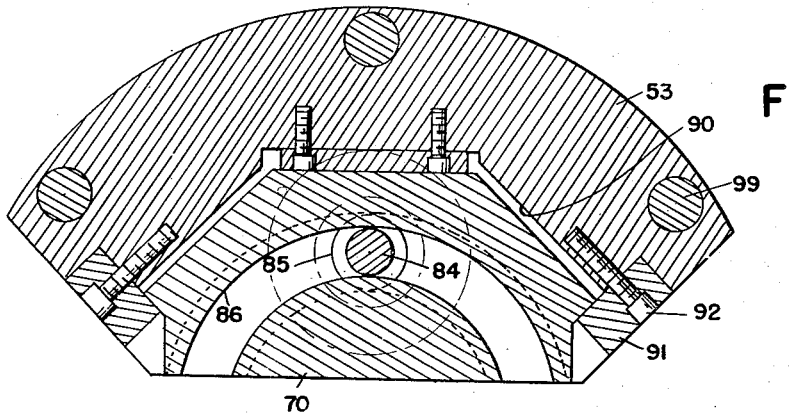

Figures 4A and 4B comprise a section on the line 4—4, Figure 2;

Figure 5 is an end elevation of the tool supporting structure;

Figure 6 is a section on the line 6—6, Figure 4A;

Figure 7 is a section on the line 7—7, Figure 4A; and

Figures 8 and 9 are detail views of a camming element employed in this mechanism.

Referring first to Figures 1 to 3, the machine comprises a very heavy rigid frame 10 having a work supporting portion 11 and a tool supporting portion 12.

The work supporting structure comprises a bedplate 13 which is shown in Figure 1 as mounted for transverse reciprocation in ways 14 formed in a vertically movable work elevating member 15, which in turn is associated with suitable elevating means such for example as a jackscrew 16. As seen in Figure 3, the frame of the machine is formed to provide for vertical adjustment of the member 15, suitable ways being provided for this purpose as shown at 16 and the frame of the machine being formed to provide inward projections 17. As will be evident, a work piece supported on the bedplate 13 may be adjusted vertically during the cutting operation to control the ultimate depth of cut and it may be moved horizontally transversely of the tool in a manner to permit extending the cut across the surface of the work piece.

As indicated in Figure 1, the machine is designed so as to be self-contained, and suitable operating mechanism therefore are contained within the housing of the main frame. Rigidly carried from the main frame is the tool supporting structure generally indicated at 12 which comprises an over-arm 20 having adjustably mounted therein a tool slide 21. As best seen in Figure 5, the over-arm 20 is provided with an elongated, downwardly opening recess 22 which receives tool slide 21. The over-arm 20 has guiding bearing inserts 23 and the slide 21 has cooperating bearing portions 24 adapted to engage the surfaces. Detachable supporting plates 25 are provided which retain the tool slide 21 in the recess 22. As indicated in Figure 5, the plates 25 may be secured in place by bolts 25' or the like. As will be evident subsequently, the working thrust of the tools during the cutting operation tends to move the tool slide upwardly and this thrust is absorbed by the inserts 23. In other words the removable plates 25 are subjected to little strain other than merely supporting the weight of the tool slide.

Suitable means are provided for reciprocating the tool slide in the over-arm 20 at speeds which may be selected in accordance with well-known cutting practice. These means may conveniently take the form of a hydraulic cylinder, but if preferred, as will be obvious, other driving means may be employed.

Referring now to Figures 4A to 7, I have illustrated the actuating mechanism and the details of the tool mechanism.

Built into the frame of the machine is a hydraulic cylinder 30 which is shown in Figure 4B as being removable and as being held in place by rods 31 passing through a web 32 in the frame casting and having threaded engagement with a member 33. At the opposite end, the rods 31 are provided with nuts 45 engaging and clamping in place a header 35 which closes the end of the cylinder 30.

Extending parallel to the cylinder 30 is a pipe 36 which communicates with the left-hand end of the cylinder 30 through suitably drilled or formed passages 37, 38. The header 35 is centrally apertured as at 39 for connection to a similar pipe (not shown). Valve mechanism is provided to alternately connect pipe 36 and the pipe connected to the aperture 39 to pressure, the other pipe being simultaneously connected to the exhaust. As a result, the piston structure which will subsequently be described is reciprocated within the cylinder 30.

An actuating piston rod 40 is provided having a free end extending within the cylinder 30. Secured to the end of the rod 40 is a piston element 41 provided with a sealing skirt 42 and attached to the rod 40 by means of bolts 43 engaging an annular member 44. A gland packing sealing the rod 40 is indicated generally at 45 and is secured in place by means of bolts 46.

Referring now particularly to Figures 4A, 5, 6 and 7, the tool carrying structure will now be described. The broaching tool itself is indicated at 50 and is rigidly locked in a tool carrier 51 which is mounted for movement about the pivot pin 52 secured within an adjustable tool support 53. The tool support 53 is formed to provide a downwardly opening recess 54 in which the tool carrier is pivotally supported. The opening 54 is closed by means of a plate 55 which in turn carries an adjustable abutment 56 adapted to cooperate with the tool carrier 51. The adjustable abutment 56 is herein shown as a threaded member having a projection 57 received within an enlarged opening 58 in the tool carrier 51. A lock nut 59 is provided for locking the abutment 56 in adjusted position. As will be readily evident, movement of the tool carrier 51 about the pivot pin 52 in a clockwise direction is limited by the adjustable abutment 56. It will further be evident that adjustment of the abutment 56 will vary the inclination of the tool 50 during the working stroke in a manner to vary the cut per tooth of said tool.

The tool support 53 has a downwardly projecting portion 60 provided with an aperture 61 in which is positioned a circular shank 62 of a camming member 63. Camming member 63 has a camming portion 64 adapted to cooperate with a correspondingly inclined top portion 65 of the tool carrier 51. As will be evident, if the camming member is moved forwardly the tool carrier 51 is moved in a clockwise direction about the pivot pin 52 until the projection 57 of the adjustable abutment 56 engages the bottom of the recess 58. This limits the swinging movement of the tool carrier and positions the broaching tool 50 in cutting position. The camming member 63 is shown in detail in Figures 8 and 9 in which it will be noted that the camming portion 64 is relatively wide and flat so as to provide a broad surface for receiving the thrust of the tool carrier 51 during the cutting stroke.

Means are provided for positively camming the tool carrier into cutting position prior to initiation of the cutting stroke and for withdrawing the camming member 63 from its camming engagement with the tool carrier 51 prior to initiation of the reverse or idle stroke. This permits the tool carrier on the idle stroke to float freely so as to avoid burning or injury to the tool.

This means comprises a block 70 having a rod 71 pinned or otherwise secured thereto as indicated at 72. The rod 71 extends forwardly into a recess 62' within the camming member 63 as shown in Figure 4A in which the pin 72 is longitudinally slidable. The relative longitudinal movement by the rod 71 and the camming member 63 is limited by means of a key 73 and a cooperating elongated notch 74 in the rod 71. Intermediate the block 70 and the camming member 63 I provide a compression spring 75 which tends to separate the block 70 and the camming member 63.

As best seen in Figure 7, the block 70 is longitudinally slidable relative to the tool support 53. The tool support 53, as shown in this figure, is provided with an elongated, downwardly opening recess 90 in which the block 70 is retained by means of movable plates 91 held in place by bolts 92 or the like.

The piston rod 40, previously referred to, at its forward end is connected to a ram 80, the connection being illustrated in Figure 4A as comprising a threaded stud 81 on the ram 80 and a lock bolt 82 associated therewith. The ram 80 at its forward portion is provided with an enlarged head 83, and in addition a forwardly extending projection 84 having an enlarged head 85 thereon. The head 85 is received within an arcuate slot 86 in the block 70, as best seen in Figure 7, to permit adjustment of the tool support 53, as will be subsequently described.

The tool slide 21 has a downwardly projecting web 87 having a circular aperture 88 therethrough through which a corresponding circular portion of the ram 80 is slidable. In Figure 4A the parts are shown in the forward position, that is during a working stroke, and it will be noted that clearance exists between the head 83 of the ram 80 and the web 87, as indicated at 89. The camming portion 64 of the camming member 63 has engaged the inclined surface 65 of the tool carrier 51 and has pivoted the same in a clockwise direction to working position. On a reverse stroke the piston rod 40 will move to the right, as seen in Figure 4A and by reason of the head 85 on the projection 84 the block 70 will also be moved to the right as seen in this figure.

Initial movement of the block 70 to the right will not cause a corresponding movement of the camming member 63, since this member at this time will be held in its left position by reason of the compression spring 75. However, prior to engagement between the head 83 of the ram 80 and the web 87 of the tool slide, the key 73 will engage the left-hand end of the elongated recess 74 in the rod 71, thus positively moving the camming member 63 to the right and withdrawing the same from the inclined surface 65 of the tool carrier 51. This permits counterclockwise movement of the tool carrier 51 about the pivot pin 52. It may be noted at this time that the axis of the pivot pin 52 is slightly forward of the first cutting tooth of the tool 50 so that this movement of the tool carrier 51 moves all cutting edges of the tool 50 into a clearance position.

I have previously referred to the fact that the tool support 53 is movable about an axis extending longitudinally of the broaching tool 50. This adjustment is provided by reason of the structure now to be described. The tool slide 21 has formed at the under-side thereof a cylindrically shaped recess for the reception of the tool support 53 which, as shown in Figures 6 and 7, has a cylindrical surface 95. The axis of the cylindrical surface 95, as well illustrated in Figure 5, is approximately at the cutting edge of the tool 50 so that adjustment of the tool support 53 in the tool slide 21 causes an adjustment of the tool 50 about a longitudinal axis, substantially coincident with its cutting edges. The tool support 53 is retained within the cylindrical recess of the tool slide 21 by means of plate 96 cooperating with curved removable guide 97 bolted or otherwise secured in the tool slide 21 as indicated at 98. Locking rods 99 extend through openings in the tool support 53 and have threaded engagement with the plate 96. At their opposite end the rods 99 pass through openings in the face plate 55 previously referred to. The face plate 55 also has a guiding inclined portion 100 associated with a removable guiding member 101. The arrangement is such that when the rods 99 are loosened so as to loosen the face plate 55 and the guide plates 96 relative to the guide members 97 and 101, the tool support may be adjusted about the axis previously described.

In order to effect this adjustment I provide an adjusting member 102 having a squared end 103 for engagement by a suitable tool and mounted within a recess 104 within the tool slide 21 and secured in place therein by means of a removable plate 105. Adjusting member 102 has formed thereon a series of teeth as indicated at 106 adapted to mesh with a circular rack 107 secured to the tool support 53. As will be evident when the clamping rods 99 are loosened sufficiently to permit adjustment of the tool support, this adjustment may take effect by rotation of the adjusting member 102, which will effect a corresponding movement of the tool support 53. As will be evident the center of curvature of the circular rack is coincident with the axis about which the tool support 53 is adjustable, namely an axis extending along and substantially coincident with the teeth of the broaching tool 50. When the tool support 53 has been moved to the desired position the rods 99 are again clamped up, locking the parts rigidly in adjusted position.

This adjustment is effected without modifying the operative relationship of the ram 80 to the tool slide 21, the cylindrical portion of the ram 80 being received within a correspondingly shaped cylindrical opening 88 in the web 87 of the tool slide. It is necessary, however, for the intermediate mechanism to be adjustable with the tool support, and it is for this reason that the block 70 is provided with an arcuate slot 86 for receiving the projection 84. As seen in Figures 4A and 7, the slot 86 is enlarged to receive the head 85 of the projection 84. Furthermore, the center of curvature of the slot 86 is also coincident with the axis about which the tool support 53 is adjustable.

It should be noted that the parts are arranged so as to take care of extremely heavy stresses during the cutting stroke, while at the same time the flexibility of adjustment is not affected, and all of the heavy cutting stresses are transmitted through proportionately heavy machine elements. Thus on the cutting stroke the ram 80 transmits its force to the block 70 which in turn engages rigidly against the heavy tool supporting member 53. At this time the camming member 63 has been moved forwardly and has locked the tool carrier 51 into operating position. The forward movement of the tool support 53 is transmitted to the tool carrier 51 through the heavy pivot pin 52, and the tendency of the tool carrier 51 to move upwardly during the cutting stroke is opposed by the camming portion 64 of the camming member 63.

In Figure 4A I have illustrated at 59' a dial associated with an adjustable abutment 56. The dial 59' may be graduated to indicate the inclination of the tool carrier 51 in operating position. As previously stated, the operating position of the tool carrier 51 depends upon adjustment of the adjustable abutment 56, as clockwise swinging of the tool carrier 51, as viewed in Figure 4A, is limited by engagement of the projection 57 with the seat or bottom of the enlarged opening 58.

By reason of the structure thus described I have provided a machine adapted to remove metal much more rapidly than could possibly be accomplished by a shaper cutter. In the present machine the cut per tooth of the broach tool 50 may be adjusted by adjusting the abutment 56. As will be readily apparent, the broach tool will be designed in accordance with the desired cut per tooth so as to provide adequate chip clearance intermediate adjacent teeth. Obviously, of course, the broaching tool may be a plane surface tool or it may have its cutting blades formed to any desired contour. If it is desired to cut an inclined surface on the work piece, the tool support may be rocked about an axis substantially coincident with the cutting edges as previously described. The mechanism is adapted to remove metal from a wide area of a work piece by the simple expedient of traversing the work supporting bed 13 in a direction transverse to to the direction of reciprocation of the tool slide 21. Successive cuts to any desired depth may be taken by elevating the work support relative to the broach.

While I have described a single form of my shaper broach the same has been done only to enable those skilled in the art to practice the invention, the scope of which is defined by the appended claims.

What I claim as my invention is:

1. A machine of the class described comprising a work supporting table, a tool slide reciprocable across said table in a working stroke and a return idle stroke, a shiftable tool carrier on said slide, a rigid abutment limiting shifting of said carrier in a work engaging direction, a movable abutment effective at initiation of a working stroke to resiliently urge said tool carrier into engagement with said rigid abutment and effective throughout the working stroke to rigidly retain said tool carrier in engagement with said rigid abutment.

2. A broaching machine for reciprocating a multiple bladed broaching tool across a work piece with the tool at a predetermined angle to said work piece comprising a work table, a tool slide mounted for reciprocation across said table, power means for reciprocating said tool slide in a working stroke and a return idle stroke, a tool carrier pivoted to said tool slide, an adjustable abutment limiting pivoting movement of said tool carrier in work engaging direction, means effective during the working stroke to lock said tool carrier against said abutment, said means being ineffective during the idle stroke whereby said tool carrier may swing to work clearance position.

3. A broaching machine for reciprocating a multiple bladed broaching tool across a work piece with the tool at a predetermined angle to said work piece comprising a work table, a tool slide mounted for reciprocation across said table, power means for reciprocating said tool slide in a working stroke and a return idle stroke, a tool carrier pivoted to said tool slide, an adjustable abutment limiting pivoting movement of said tool carrier in work engaging direction, a spring pressed cam engaging said tool carrier and urging said tool carrier against said abutment, and connections between said cam and said power means for withdrawing said cam from said tool carrier on the idle return stroke.

4. A broaching machine for reciprocating a multiple bladed broaching tool across a work piece with the tool at a predetermined angle to said work piece comprising a work table, a tool slide mounted for reciprocation across said table, a power ram for reciprocating said tool slide in a working stroke and a return idle stroke, a tool carrier pivoted to said tool slide, an adjustable abutment limiting pivoting movement of said tool carrier in work engaging direction, said tool carrier having an inclined surface, a wedge cam engageable with said inclined surface and slidable relative thereto, a spring intermediate said ram and said wedge cam, and cam release means effective during the first part of the return stroke to withdraw said wedge cam from said inclined surface.

5. In a machine tool, a tool slide, a tool carrier pivoted to said slide for movement between cutting and idle positions, an adjustable abutment on said slide for said carrier limiting movement of said support toward cutting position, a power ram for reciprocating said slide having lost motion with respect thereto, a camming member movably mounted on said slide and adapted on the cutting stroke of said slide to pivot said tool carrier into engagement with said abutment, and connections between said ram and said camming member adapted on the idle stroke of said slide to withdraw said camming member from said tool carrier.

6. In a machine tool, a tool slide, a tool carrier pivoted to said slide for movement between cutting and idle positions, an adjustable abutment on said slide for said carrier limiting movement of said support toward cutting position, a power ram for reciprocating said slide having lost motion with respect thereto, a camming member movably mounted on said slide and adapted on the cutting stroke of said slide to pivot said tool carrier into engagement with said abutment, resilient means biasing said camming member toward said carrier, and connections between said ram and said camming member adapted on the idle stroke of said slide to withdraw said camming member from said tool carrier.

7. In a machine tool, a reciprocable tool slide, a tool support mounted on said slide for adjustment about an axis parallel to the direction of reciprocation, circular rack and pinion means for adjusting said tool support, releasable clamping means for retaining said support in adjusted position, a tool carrier mounted on said tool support for movement between work engaging and work clearance position, power means for reciprocating said tool slide, and means effective in all positions of adjustment of said tool support during the working stroke to move said tool carrier to work engaging position and during the idle stroke to permit movement of said tool carrier to work clearance position.

8. In a machine of the class described, a frame, a tool slide mounted for reciprocation on said frame, a tool support adapted to carry an elongated broaching tool, said tool support being mounted on said slide for adjustment about an axis extending along the active surface of said broaching tool, a tool carrier pivoted to said tool support, a camming member slidably mounted on said tool support and engageable with said tool carrier, a power ram carried by said frame and having limited lost motion with respect to said tool slide, a secondary ram slidably mounted on said tool support having a retracting member adapted to withdraw said camming member from said tool carrier, an arcuate slot in said secondary ram, and a headed member carried by said power ram received in said slot and providing for adjustment of said tool support and said secondary ram about said axis.

9. In a machine of the class described, a frame, a tool slide mounted for reciprocation on said frame, a tool support adapted to carry an elongated broaching tool, said tool support being mounted on said slide for adjustment about an axis extending along the active surface of said broaching tool, a tool carrier pivoted to said tool support, a camming member slidably mounted on said tool support and engageable with said tool carrier, a power ram carried by said frame and having limited lost motion with respect to said tool slide, a secondary ram slidably mounted on said tool support having a refraction member adapted to withdraw said camming member from said tool carrier, a spring between said secondary ram and said camming member urging said camming member toward said tool carrier, an arcuate slot in said secondary ram, and a headed member carried by said power ram received in said slot and providing for adjustment of said tool support and said secondary ram about said axis.

10. In a machine tool of the class described, a tool support, a tool carrier for mounting an elongated broaching tool, a pivotal connection between said tool support and said tool carrier, the axis of said pivotal connection being transverse to the length of said tool and located ahead of said tool, an adjustable abutment on said tool support adapted to limit movement of said tool carrier toward a work piece, and resilient means urging said tool carrier toward said abutment on initiation of the working stroke and effective to retain said tool carrier rigidly in position during said working stroke.

11. In a machine tool of the class described, a tool support, a tool carrier for mounting an elongated broaching tool, a pivotal connection between said tool support and said tool carrier, the axis of said pivotal connection being transverse to the length of said tool and located ahead of said tool, an adjustable abutment on said tool support adapted to limit movement of said tool carrier toward a work piece, said abutment being engageable with said tool carrier substantially beneath said pivotal connection, and resilient means urging said tool carrier toward said abutment on initiation of the working stroke and effective to retain said tool carrier rigidly in position during said working stroke.

12. In a machine of the class described, an elongated broaching tool having a series of cutting teeth, means for reciprocating said tool longitudinally, actuating means effective upon initiation of a working stroke to vary the angularity of said tool to control the depth of cut per tooth, said last means being effective on the idle stroke to release said tool for movement to tool clearance position.

13. In a machine of the class described, an elongated broaching tool having a series of cutting teeth, means for reciprocating said tool longitudinally, actuating means effective upon initiation of a working stroke to pivot said tool about an axis ahead of said tool and transverse to its length, adjustable means limiting the pivotal movement of said tool to control the depth of cut per tooth, said actuating means being effective on the idle stroke to release said tool for movement to tool clearance position.

14. In a machine of the class described, an elongated broaching tool having a series of cutting teeth, means for adjusting said tool about a longitudinal axis substantially in the plane of said cutting teeth, means for reciprocating said tool longitudinally, actuating means effective upon initiation of a working stroke to vary the angularity of said tool to control the depth of cut per tooth, said last means being effective on the idle stroke to release said tool for movement to tool clearance position.

15. In a machine of the class described, a tool support, means for reciprocating said support, an elongated tool carrier pivoted to said support, said carrier adapted to carry an elongated broaching tool, the pivot connection between said support and carrier being located ahead of the broaching tool and transverse to its length, said pivot connection being a draft connection for drawing said tool through a work piece, and resiliently actuated means adapted upon initiation of a working stroke to swing said carrier to working position and to retain said carrier rigidly in working position.

16. In a machine tool of the character described, a frame, a vertically adjustable work supporting table, an over-arm on said frame, a tool slide mounted on said over-arm for reciprocation, a work support on said table mounted for adjustment transverse to the direction of reciprocation of said tool slide, a power ram for reciprocating said tool slide, an elongated broaching tool carried by said slide, means for rigidly locking said tool in cutting position upon initiation of a work stroke and for permitting movement of said tool to clearance position during reverse idle strokes.

17. In a machine tool of the character described, a frame, a vertically adjustable work supporting table, an over-arm on said frame, a tool slide mounted on said over-arm for reciprocation, a work support on said table mounted for adjustment transverse to the direction of reciprocation of said tool slide, a power ram for reciprocating said tool slide, an elongated broaching tool carried by said slide, means for rigidly locking said tool in cutting position upon initiation of a work stroke and for permitting movement of said tool to clearance position during reverse idle strokes, and adjustable means for varying the cutting position of said tool to control the cut per tooth thereof.

18. In a machine tool of the character described, a frame, a vertically adjustable work supporting table, an over-arm on said frame, a tool slide mounted on said over-arm for reciprocation, a work support on said table mounted for adjustment transverse to the direction of reciprocation of said tool slide, a power ram for reciprocating said tool slide, an elongated broaching tool carried by said slide, means for adjusting said tool on said slide about an axis substantially parallel to the direction of reciprocation of said tool and substantially in the plane of its cutting teeth, means for rigidly locking said tool in cutting position upon initiation of a work stroke and for permitting movement of said tool to clearance position during reverse idle strokes.

19. In a machine of the class described, a reciprocable tool slide, a tool carrier pivoted on said slide for movement between cutting and clearance positions, a rigid abutment on said slide engageable by said carrier on movement to cutting position, a second abutment movable on said slide and engageable with said carrier to move said carrier into engagement with said first mentioned abutment upon initiation of a cutting stroke, whereby during a cutting stroke said pivoted carrier is rigidly locked between abutments.

20. In a machine of the class described, a reciprocable tool slide, a tool carrier pivoted on said slide for movement between cutting and clearance positions, a rigid abutment on said slide engageable by said carrier on movement to cutting position, a second abutment movable on said slide and engageable with said carrier to move said carrier into engagement with said first mentioned abutment, means for reciprocating said slide, and means associated with said means for moving said second abutment on said slide toward and away from said carrier upon initiation of cutting and return strokes respectively.

WALTER S. PRAEG.